(12) United States Patent
Morrison (10) Patent No.: US 8,102,073 B2
(45) Date of Patent: Jan. 24, 2012

(54) WIND TURBINE ALTERNATOR MODULE

(76) Inventor: Daniel Morrison, Chantilly, VA (US)

( * ) Notice: Subject to any disclaimer, the term of this patent is extended or adjusted under 35 U.S.C. 154(b) by 0 days.

(21) Appl. No.: 12/886,518

(22) Filed: Sep. 20, 2010

(65) Prior Publication Data

US 2011/0140443 A1    Jun. 16, 2011

(51) Int. Cl.
*F03D 5/04* (2006.01)
(52) U.S. Cl. .......................... 290/55; 290/44
(58) Field of Classification Search ............... 290/43, 290/44, 54, 55; 415/4
See application file for complete search history.

(56) References Cited

U.S. PATENT DOCUMENTS

| | | | |
|---|---|---|---|
| 1,944,239 A | 1/1934 | Honnef | |
| 4,118,636 A | 10/1978 | Christian | |
| 4,289,970 A * | 9/1981 | Deibert | 290/44 |
| 4,379,972 A * | 4/1983 | Sosa et al. | 290/44 |
| 4,421,967 A * | 12/1983 | Birgel et al. | 219/631 |
| 4,720,640 A | 1/1988 | Anderson | |
| 4,945,693 A | 8/1990 | Cooley | |
| 6,064,123 A * | 5/2000 | Gislason | 290/55 |
| 6,097,104 A * | 8/2000 | Russell | 290/54 |
| 6,215,199 B1 | 4/2001 | Lysenko | |
| 6,877,948 B2 | 4/2005 | Cutcher | |
| 7,084,520 B2 | 8/2006 | Zambrano | |
| 7,112,893 B1 | 9/2006 | Villanueva | |
| 7,116,006 B2 * | 10/2006 | McCoin | 290/54 |
| 7,157,805 B2 | 1/2007 | Mooring | |
| 7,215,038 B2 * | 5/2007 | Bacon | 290/55 |
| 7,276,809 B2 | 10/2007 | Zambrano | |
| 7,303,369 B2 | 12/2007 | Rowan | |
| 7,315,093 B2 | 1/2008 | Graham, Sr. | |
| 7,323,791 B2 | 1/2008 | Jonsson | |
| 7,417,334 B2 * | 8/2008 | Uchiyama | 290/55 |
| 7,482,720 B2 | 1/2009 | Gordon | |
| 7,579,701 B1 * | 8/2009 | White | 290/43 |
| 7,582,982 B1 * | 9/2009 | Deal | 290/55 |
| 7,605,486 B2 * | 10/2009 | Bridwell | 290/43 |
| 7,656,135 B2 * | 2/2010 | Schram et al. | 322/59 |
| 7,728,455 B2 * | 6/2010 | Branco | 290/55 |
| 2008/0265584 A1 | 10/2008 | Teng | |
| 2010/0068030 A1 | 3/2010 | Nightingale et al. | |
| 2010/0126086 A1 | 5/2010 | Paggi | |
| 2010/0140951 A1 | 6/2010 | Pitre | |

* cited by examiner

*Primary Examiner* — Nicholas Ponomarenko
(74) *Attorney, Agent, or Firm* — Hyra IP, PLC; Clifford D. Hyra (57) ABSTRACT

A wind turbine alternator module having an enclosure, turbine and rotor assembly with peripheral magnets and multi-phase stator for the production of energy from air movement. A bi-directional symmetrical vane turbine and rotor assembly is suspended in the enclosure by guide bearings around the periphery to permit operation in all wind conditions. One or more wind turbine alternator modules are combined in a polygonal housing with bottom inlets and attached to a roof vent structure to generate power from wind and/or rising heated air. A low temperature heating circuit is used for protection in cold conditions. One or more wind turbine alternator modules are combined in a manually portable polygonal housing with storage batteries, charging circuit, inverter circuit, power connectors and ancillary convenience apparatuses such as lighting, radio, tv, and emergency locator.

20 Claims, 8 Drawing Sheets

WIND TURBINE ALTERNATOR MODULE

FIELD OF THE INVENTION

The present invention relates to power generation and more specifically to wind power generation devices.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

A new apparatus includes a support structure or enclosure, a turbine assembly including one or more vanes radiating from an unsupported hub to an outer rim, bearings located around and engaged with the turbine assembly or rotor assembly and supported by the enclosure that provide consistent separation between rotor magnets and stator coils, a rotor assembly including one or more magnets supported by the turbine assembly, and a stator having one or more coils configured such that relative motion between the rotor magnets and stator coils induces a voltage across the stator coils. The outer rim is in some embodiments a peripheral circle around the tips of the vanes. The rotor in some embodiments is a distinct structure from the turbine assembly, however in some embodiments a combination of the vanes or outer rim of the turbine assembly with attached magnets constitutes the rotor. The bearings provide consistent separation between rotor magnets and stator coils by supporting the rotor at the periphery and preventing it from axial movement in varying wind conditions.

Singularly, apparatus modules of any size lend themselves to new unlimited uses. Having the ability to utilize a self contained module that is capable of operating in all wind or air flow conditions allows deployment in any location where air movement exists.

Multiple apparatus modules each producing a small portion of energy, as in micro-generation, all contribute to the total energy produced at a site. In some embodiments, multiple small modules are operated in low wind areas to produce cumulatively higher energy output. The concept of micro-generation is particularly well suited to residential and commercial sites in suburban and possibly some urban areas where traditional wind generation is not feasible.

In the preferred embodiment, the new apparatus or module includes a rotating turbine assembly with permanent magnets around the periphery and air coils in close proximity to the magnets to generate energy. One or more rotor backing rings are attached peripherally and preferably perpendicular to the turbine rim to support the equally spaced permanent magnets.

Multiple permanent magnet and coil arrangements are possible, depending on power generation requirements, as would be obvious to a person skilled in the art. As turbine weight and/or size increases, it is in some embodiments necessary to place more guide bearings in multiple locations around the backing rings or directly supporting the turbine rim to distribute the turbine assembly load.

In one embodiment, one or more rotor backing rings are constructed of ferromagnetic material, which serves to increase the magnetic field from the mounted permanent magnets, resulting in increased energy production in all wind conditions. Use of ferromagnetic materials for one or more rotor backing also provides additional rotational inertia, allowing the turbine and rotor assembly to continue rotating after the wind slows, resulting in increased energy production between wind gusts. The ferromagnetic rotor backing provides for stable support of the turbine and rotor assembly within the enclosure guide bearings.

The module utilizes air coils for the stator to eliminate cogging associated with ferromagnetic cores and reduce starting torque, resulting in energy production in low winds and reduced unit weight.

A major advantage of the module is the implementation of multiple guide bearings placed around the turbine assembly, which support the turbine peripherally to maintain stability and constant spacing during all wind speeds. The guide bearings in some embodiments are grooved to engage a rotating rotor backing ring, providing both radial and axial support. In some embodiments, the guide bearings may be flanged and peripherally engage the turbine outer rim directly.

To provide for increased bearing life and reduced friction, in some embodiments the bearings are made of ceramic or similar low coefficient of friction material. Using a ceramic or like material reduces starting torque resulting in lower wind start speeds and reduces the creation of heat at higher speeds. The use of a non-ferrous material is advised to prevent magnetic interaction with the rotating ferrous rotor assembly and to prevent eventual corrosion of the rotor ring.

Prior art teaches that wind turbines must furl or fold or the vanes or blades must feather to reduce the axial pressure experienced from the wind. Furling or feathering of prior art means that the wind turbine is producing little or no energy during high wind conditions. Severe damage to a wind turbine can occur if any of the furling or feather mechanisms fail to operate, resulting in potential danger to life and property.

The ability to handle high wind conditions resulting from the novel bearing supports negates a requirement to furl or fold out of the wind, as required in prior art, and allows for continued energy production in said conditions.

Since the turbine assembly in some embodiments is completely suspended and supported peripherally by guide bearings, there are no turbine axis supports, as are required in prior art, which interfere with turbine air flow. This contributes to better energy production in low winds or indirect wind flow and reduced obstructive turbulence in higher winds.

Another advantage of the module is symmetrical bi-directional vanes of the turbine assembly. Providing for energy production from either direction allows for energy production without a requirement for pivoting the turbine into a reversing wind, as required in prior art. The symmetrical bi-directional vanes are also well suited to be driven by indirect wind angles, aiding in energy production in fixed or non-pivoting installations. The utilization of said vanes also allows in pivoting implementations the added advantage of only requiring a maximum of 180 degrees horizontal rotation, instead of the typical 360 degrees of rotation required in prior art.

In one embodiment, the module produces alternating current due to multi-phase stator air coil windings and includes a rectifier circuit to convert generated alternating current into direct current.

To facilitate monitoring operation, in some embodiments the module is equipped with an operational sensing circuit to produce visual or electrical feedback of rotation or power generation.

The module enclosure in some embodiments allows for a sloped conical air collector on one or both sides to aid in directing increased air flow into the turbine.

In some embodiments, heat coils located in the turbine module activate in low temperature conditions to warm the enclosure surfaces to help reduce snow and ice buildup. This allows for energy production year-round.

As a limit to over-voltage conditions, in some embodiments the module or polygon housing contains a voltage regulator circuit capable of dumping excess energy to a resistance load. The resistance load is internal or external, depending on design requirements. Some designs use the voltage regulator circuit to regulate stator coils to limit over-voltage conditions and/or to slow turbine assembly rotation, thereby preventing excess energy at high wind speed conditions.

Prior art and published data teaches that energy production from wind is impractical in urban and suburban areas and areas of low average wind speeds. It also teaches that to capture wind energy requires installation of wind generators at considerable height above ground and at a distance from buildings, structures or obstacles. Installation of tower structures also adds to initial costs. All of this limits availability of wind energy as a resource for most populated areas.

To address the need for wind energy production in conditions previously considered unsuitable, two wind turbine alternator modules are placed at opposing ends of a polygonal housing, that is cut-out or vented from the bottom to allow for upward air flow. The polygonal housing is seated and attached to a roof mounted vent structure that allows air to rise from the heated attic space below into the polygonal housing and out through the turbine modules. Multiple polygonal housings are placed side by side across the ridge of a roof to cumulatively produce energy from the wind blowing up and across the roof and/or rising heated air from below. Unique to the embodiment is the suction of the air from the attic space below in higher wind conditions and heated air contributing to energy production in low wind. The polygon housing may optionally be mounted over an existing roof vent, allowing for easy retrofit installations.

Similarly, in some embodiments, multiple polygonal housings are mounted on any roof surface, chimney, parapet, pole or other building structure, with or without venting to attached surface. Housings and attachment structures are separate pieces in some embodiments and are integrated into one unit in others, depending on site requirements.

The materials used are dependent upon the intended installation requirements. In some embodiments the enclosure and turbine assembly are a hard plastic-like material with characteristics suitable for the intended environment, such as exterior usage, though the design imposes no such limitations.

In some embodiments, the roof vent structures are of standard roof building materials, allowing for installation or retrofit by building contractors and installers.

One embodiment provides a manually portable polygonal housing with multiple wind turbine alternator modules, enclosed storage batteries, charging circuit and inverter circuit. This embodiment provides the ability to produce wind generated power from any location, for example when camping or boating, on a recreational vehicle, or for emergency use. Add-ons such as lighting, radio, tv, emergency locator and others are incorporated into the portable housing in some embodiments.

In some embodiments, wind turbine alternator modules and polygonal housing are incorporated into buildings, vehicles, vessels, structures or property to produce energy from air movement.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

LIST OF REFERENCE NUMERALS

20: Wind turbine alternator module
21: Enclosure
22: Conical air collector
30: Turbine assembly
31: Symmetrical bi-directional vane
32: Peripheral rim
33: Hub
40: Turbine rotor assembly
42: Ferromagnetic rotor backing ring
43: Permanent magnet
44. Air Gap
51: Bearing
52: Bearing guide
60: Stator assembly
61: Stator air coils
62: Stator support
70: Polygon housing
71: Roof attachment structure
72: Center pivot
73: Bracket
74: Parapet
80: Roof vent
81: Heated air vent hole
82: Roof nail flange
83: Roof rafters
85: Roofing shingles
86: Roof ridge
87: Attic space
88: Air exchange space
91: Handle
92: Storage batteries
93: Charging circuit 94: Inverter circuit
96: A.C. power connector
97: D.C. power terminal posts
98: USB power connector
W: Wind
H: Rising hot air

DETAILED DESCRIPTION

A wind turbine alternator module will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail.

The description is not to be taken in a limiting sense, but is made merely for the purpose of illustrating the general principles of the invention, since the scope of the invention is best defined by the appended claims.

Figure 1:
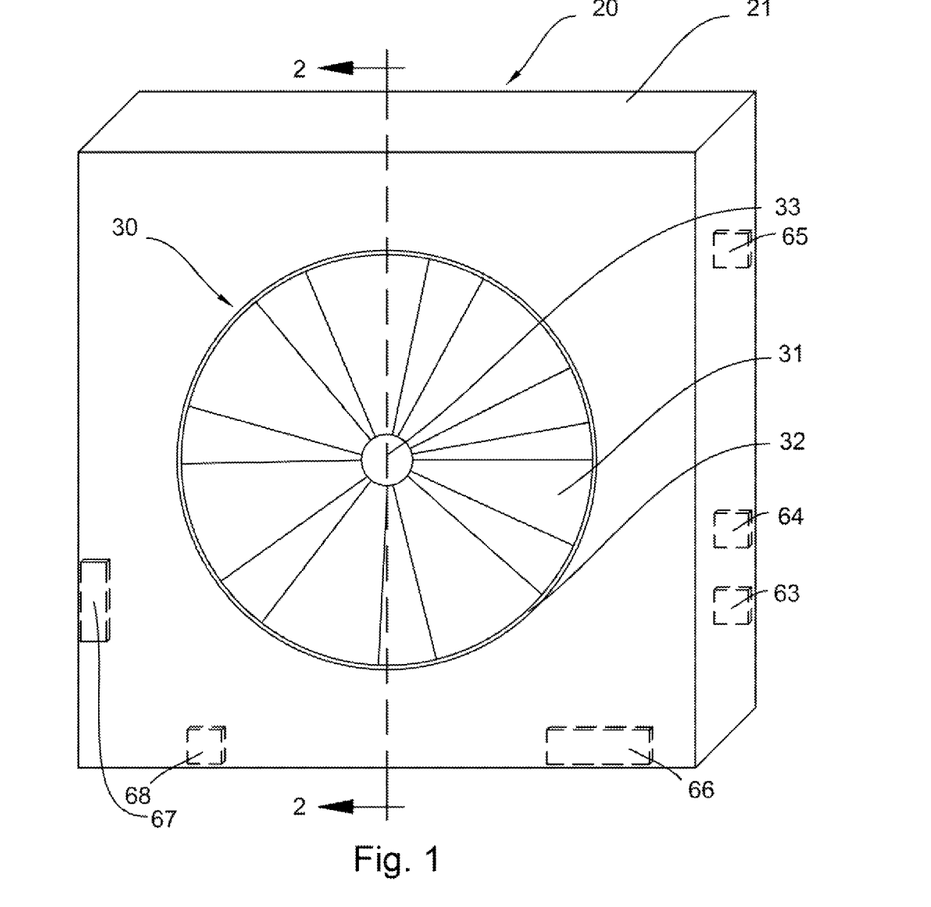
FIG. 1 is a front perspective view of a first embodiment of a wind turbine alternator module assembly.

FIG. 1 is a front perspective view of a first embodiment of a wind turbine alternator module assembly 20. The purpose of the wind turbine alternator module is to generate electrical power from wind or air movement energy.

A self supporting structure or enclosure 21 supports and encases all of the component parts of the module 20. The support structure or enclosure 21 provides the support to the enclosed turbine assembly 30 such that it may rotate from air movement through the turbine vanes 31.

Rotating within the enclosure 21 is a turbine assembly 30, consisting of a hub 33, which serves as a central point of attachment for the symmetrical bi-directional vanes 31, which radiate outward and attach to a peripheral rim 32. The hub 33 is of any conical or pointed shape to help direct air flow into the turbine assembly 30. Bi-directional vanes 31, allow air movement arriving from either the front or back side of the enclosure 21, to rotate the vanes 31 as the fluid air moves laterally across the vanes 31.

It should be noted, there is no axle or external support or attachment structures associated with the turbine assembly hub 33, as depicted. As such, there are no support structures to impede air flow through turbine vanes 31. Features of the enclosure 21 and turbine assembly 30 typically appear the same from both sides of the module 20.

The design of the enclosure 21 imposes no limitations on physical size, shape, materials or attachment mechanism and allows for use in any circumstance where it is desirable to produce energy from air movement. This may include utilization as standalone energy production or in combination with other wind turbine alternator modules, separately or integrated into polygon housings for cumulative energy production, such as in micro-generation.

Module assembly 20 construction is in some embodiments of strong plastic-like materials suitable for the installation, with only a few internal parts required to be of non-plastic materials, as is evident in the following.

Enclosures 21 are in some embodiments small, only a few inches in size, to accommodate air flow in small apparatuses or structures, for example a circuit board or vehicle ventilation. In other embodiments, enclosures 21 are large, being many feet across, for maximizing energy production from natural wind.

Enclosure 21 depth is limited to minimize extension beyond the turbine assembly 30 so as to not disrupt air flow, yet sufficiently sized to contain turbine assembly 30 and any circuits (not shown), such as rectifier circuit, temperature sensing circuit and heat elements, operational sensing circuit and voltage regulation system. Optional circuits and necessary components in some embodiments are placed in empty body cavities of enclosure 21 as needed.

As shown, the square or rectangular enclosure 21 shape, lends itself to easy placement, aggregated assembly and easy attachment. An optional FIG. 6 conical air collector 22 in some embodiments is attached, or built in, to one or both sides of the enclosure 21 to help direct and compress air flow into the turbine assembly 30. The module 20 in some embodiments supports a center pivot which allows the module 20 to rotate where required. Rotation about an axis allows the enclosure 21 and the enclosed turbine assembly 30 to be directed to better capture air flow.

Internally, the enclosure 21 has unfilled cavities (not shown), which are in some embodiments used to contain various optional circuits and connection hardware. Since the stator is wired for multi-phase alternating current energy production, in some embodiments the enclosure 21 supports a multi-phase rectifier circuit (not shown) in one of the available cavities, to convert the alternating current to direct current for external use or aggregation with other energy sources. In some embodiments, the rectifier circuit is placed on or in an exterior surface of the enclosure 21. The rectifier circuit in some embodiments is omitted, depending on energy requirements.

To aid in low temperature conditions, the enclosure 21 in some embodiments contains a temperature sensing circuit (not shown) and various resistance, ceramic or carbon type heating coils (not shown) placed throughout the enclosure 21 cavities or embedded in enclosure 21 materials. This circuit helps keep the module exterior warm enough to prevent freezing in cold temperatures.

Some implementations require feedback as to operation or performance of the turbine assembly 30. An internal sensor circuit (not shown) may be placed near the rotating turbine assembly 30, such as a Hall effect sensor to communicate rotation speed to for example a built-in light emitting diode for indication of rotation or connection to external equipment for processing.

Figure 3:
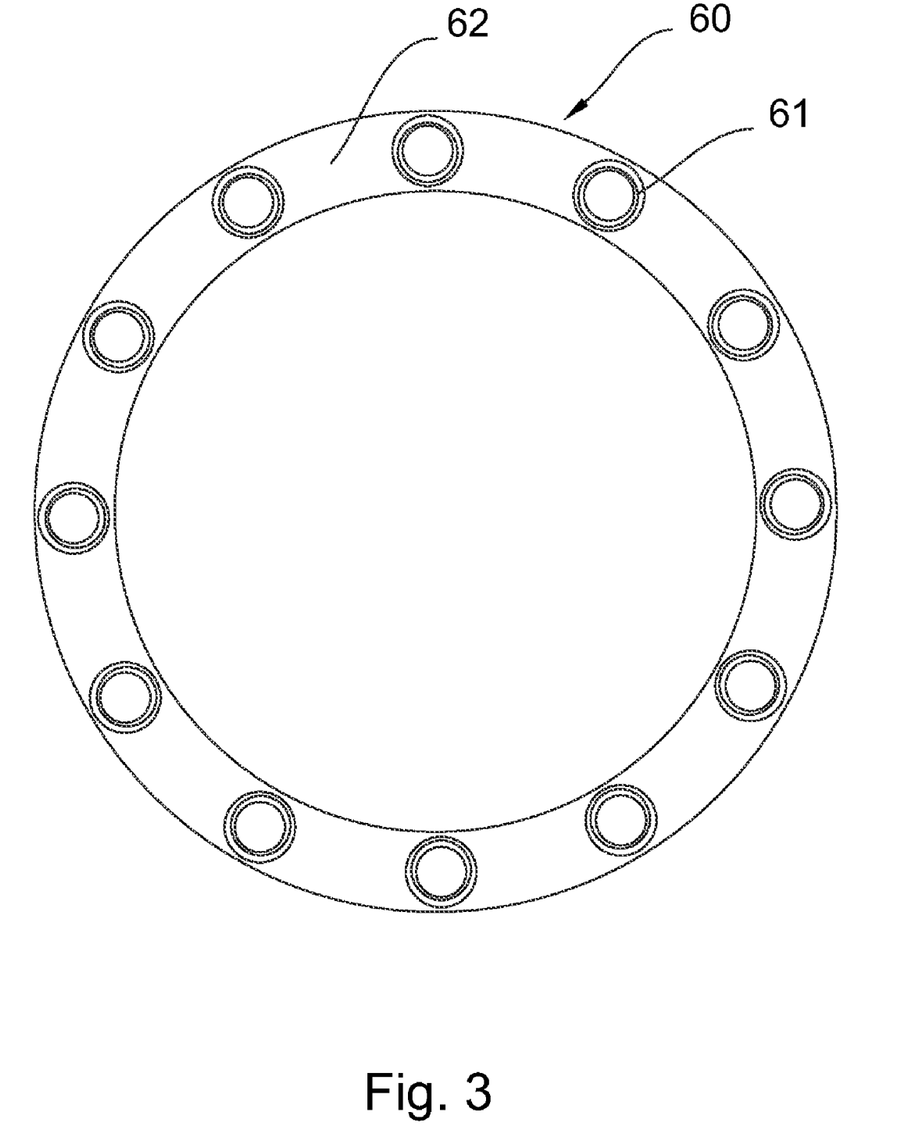
FIG. 3 is a front view of a stator coil assembly.

Under some conditions, where energy production is too much for proper usage, a voltage regulator circuit (not shown) is mounted in the enclosure 21 cavities along with various resistive or dump loads (not shown), external dump load connections (not shown) or circuits designed to regulate FIG. 3 stator coils 61 such that they effectively produce less energy or slow the turbine assembly 30 rotation. Dump loads are in some embodiments a resistance coil which allows energy to be converted into heat.

Figure 2:
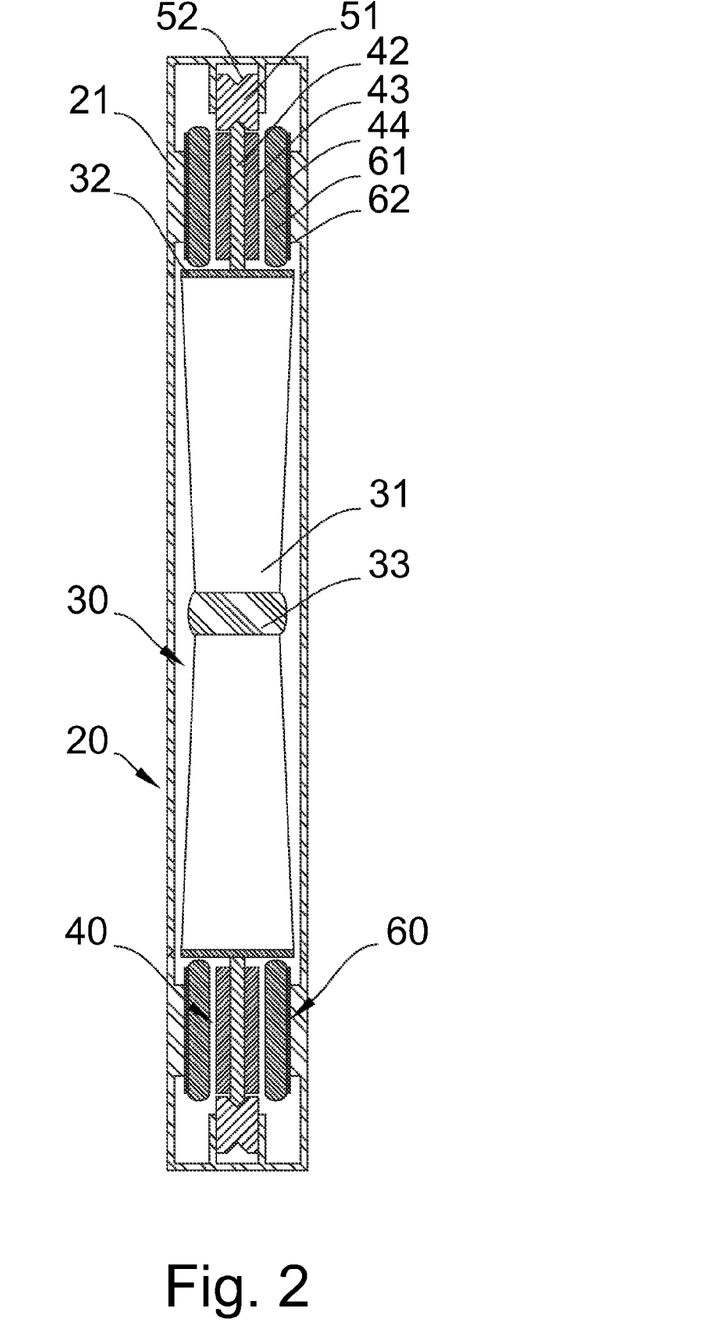
FIG. 2 is a cutaway side view of the wind turbine alternator module assembly of FIG. 1 showing the turbine assembly, turbine rotor, stator coils and bearings.

FIG. 2 is a cutaway side view of the wind turbine alternator module assembly 20 of FIG. 1 which employs the turbine assembly 30, turbine rotor assembly 40, stator coils 61 and bearings 51. As depicted, the turbine assembly 30, consisting of a hub 33, symmetrical bi-directional vanes 31 and outer rim or peripheral rim 32, supports and rotates in conjunction with the attached turbine rotor assembly 40, consisting of a ferromagnetic backing ring 42 supporting multiple permanent magnets 43, within the enclosure 21. The turbine assembly 30 and turbine rotor assembly 40 are rotationally supported by multiple bearings 51 with a bearing groove or guide 52 placed within the enclosure 21. Adjacent to and in close proximity to the rotor assembly 40 are stator assemblies 60 consisting of a plurality of fixed stator air coils 61 separated by an air gap 44.

The turbine assembly 30 rotates as the fluid air moves laterally across the vanes 31, which rotates the attached rotor assembly 40, inducing a current in the adjacent stator coils 61, resulting in the production of energy from the air movement.

One or more (only one is shown) rotor backing rings 42 are attached peripherally and preferably perpendicular to the turbine rim 32 to support the equally spaced permanent magnets 43.

Note the hub 33 which only connects to the vanes 31. This non-supported hub 33 is contrary to prior art teachings, which use a traditional axle-style hub to support the vanes 31.

The turbine rotor assembly 40, utilizes a novel bearing design, consisting of a non-ferrous bearing with a special groove or guide 52 shape. The bearing guide 52 is uniquely designed to saddle and directly contact the rotating turbine rotor backing ring 42. The bearing material is non-ferrous so that the rotating magnets 43 will not magnetize the bearings 51. Bearings 51 in some embodiments are of a material that will not corrode when in contact with the rotor backing ring 42 material. Bearing groove or guide 52 is shaped as required to best saddle and support the rotor assembly 40 and provide the least resistance to rotation.

Figure 4:
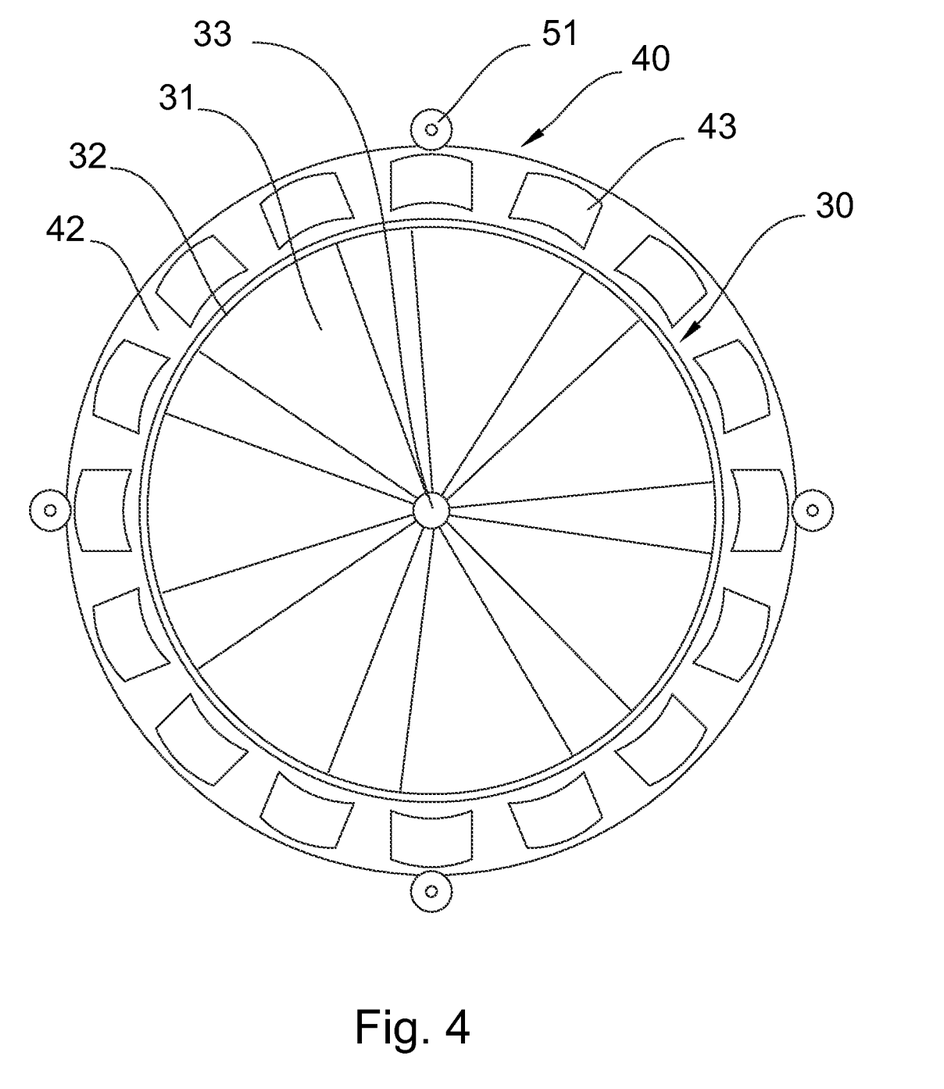
FIG. 4 is a front view of a turbine assembly, turbine rotor assembly and bearings.

FIG. 3 is a front view of a stator coil assembly 60. Multiple air coils 61 are placed on a stator support 62 located adjacent to and in close proximity to, but not touching, rotor permanent magnets 43 on turbine rotor assembly 40 as shown in FIG. 4. Stator support 62 is located within the enclosure 21 of FIG. 2 opposite the turbine rotor assembly 40 as shown in FIG. 4.

Stator air coils 61 are wired multi-phase for the generation of alternating current. Air coil 61 shape, spacing and sizing is dependent on the shape, spacing and size of the permanent magnets 43 as shown in FIG. 4 as per energy generation requirements. Coils in certain embodiments are spaced apart or overlapping, depending on magnet spacing and multi-phase configuration.

It should be noted that the stator air coils 61 in some embodiments have no ferromagnetic material and are designed to have no undesirable cogging torque, which allows for minimal turbine rotational start torque in low wind conditions. However, alternative embodiments utilize ferromagnetic materials or electromagnetic coils, especially in installations designed for higher required starting torque, resulting in higher energy production.

FIG. 4 is a front view of a turbine assembly 30, turbine rotor assembly 40 and bearings 51. The symmetrically shaped turbine vanes 31 radiate out from the central hub 33 to convert air movement into turbine assembly 30 rotation. The center hub 33 may be of any size, but since the center hub 33 does not provide structural rotational support it is in some embodiments sized and shaped to be least air flow restrictive.

It should be noted that the hub 33 only serves as a point of origin for the bi-directional vanes 31 and is not a structurally supported axis of rotation. Turbine vanes 31 are attached at the center hub 33 and radiate out and attach to a flat circumferential peripheral rim 32. The rim 32 serves as an attachment point for the outer edges of the bi-directional vanes 31 and as a platform to attach and support the rotor assembly 40 components. The peripheral rim 32 provides considerable strength and stability to the turbine assembly 30, most specifically the outer edges of the vanes 31 and in some embodiments eliminates a need for central hub 33 support.

In some embodiments perpendicular to the peripheral rim 32 is one or more rotor backing rings 42. The rotor backing rings 42 serve to hold the plurality of rotor permanent magnets 43. The design allows for multiple arrangements of the rotor backing rings 42 and the associated stator air coils 61, as shown in FIG. 3. Additional rotor backing rings 42, supporting rotor permanent magnets 43 are added to increase energy production per rotation. There is no specific limit as to the rotor assembly 40 and stator assembly 60 configuration, as the design allows for adjustments based on physical size, magnetic flux density, coil windings and energy requirements. Alternate embodiments employ direct mounting of magnets 43 to the outer rim 32 or placement of multiple rotor backing rings 42 of varying materials as required.

Shown located around the perimeter of the ferromagnetic rotor backing ring 42 are bearings 51 to provide turbine assembly 30 rotational radial support within the FIG. 2 enclosure 21. To insure axial support for the rotating turbine 30, the bearings 51 have bearing guides 52, as shown in FIG. 2, that saddle the rotating support or in some embodiments have a flange to set into a groove or slot (not shown) of a rotating support surface. Providing bearing 51 support at a location at the perimeter of the turbine rotor 40 allows the turbine 30 to rotate, with accuracy, in all wind speeds. The bearings 51 are supported by the FIG. 2 enclosure 21.

Bearing 51 placement and quantity are dependent on the size and weight of the turbine rotor assembly 40. In smaller embodiments at least three bearings 51 are used (four are shown), with more utilized as the turbine assembly 30 diameter increases and in some embodiments bearings 51 are placed equidistant around the circumference. The design allows that the turbine rotor assembly 40 in some embodiments is also be supported at different points, such as directly by the peripheral rim 32 and utilizing different bearing types and materials. The bearings 51 in some embodiments are low friction and durable, such as a ceramic-type bearing. Using a ceramic or like material reduces turbine assembly 30 rotational starting torque. Using a low coefficient of friction bearing, such as ceramic or polytetrafluoroethylene produces less heat at higher speeds, resulting in longer bearing life.

Figure 5:
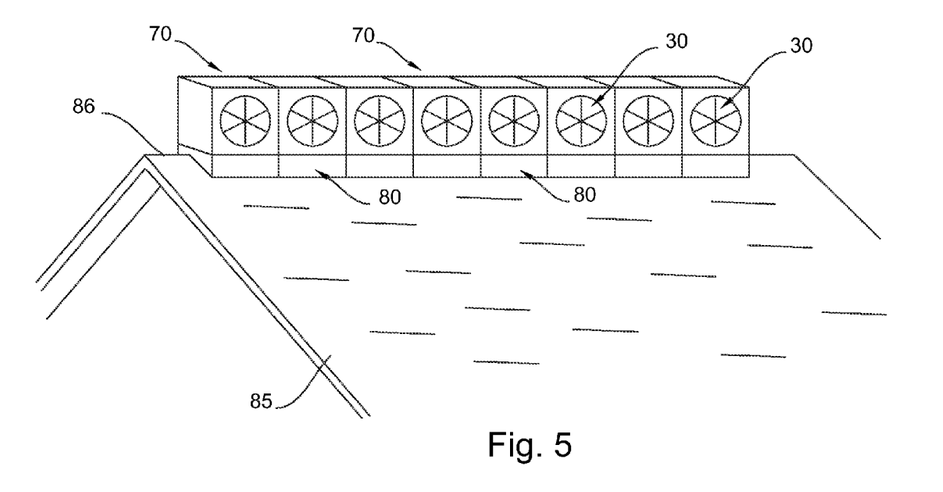
FIG. 5 is a perspective view of a second embodiment of a wind turbine alternator depicting multiple polygonal housings including a roof vent assembly for the purposes of mounting on a roof.

FIG. 5 is a perspective view of a second embodiment of a wind turbine alternator module 20 depicting multiple polygonal housings 70 including a roof vent assembly 80 for the purposes of mounting on a roof 85. The polygonal housing 70 as depicted shows a turbine assembly 30 on the front side and has a turbine assembly 30 (not showing) on the opposing side. The polygonal housing 70 is attached to a roof vent assembly 80.

Figure 7:
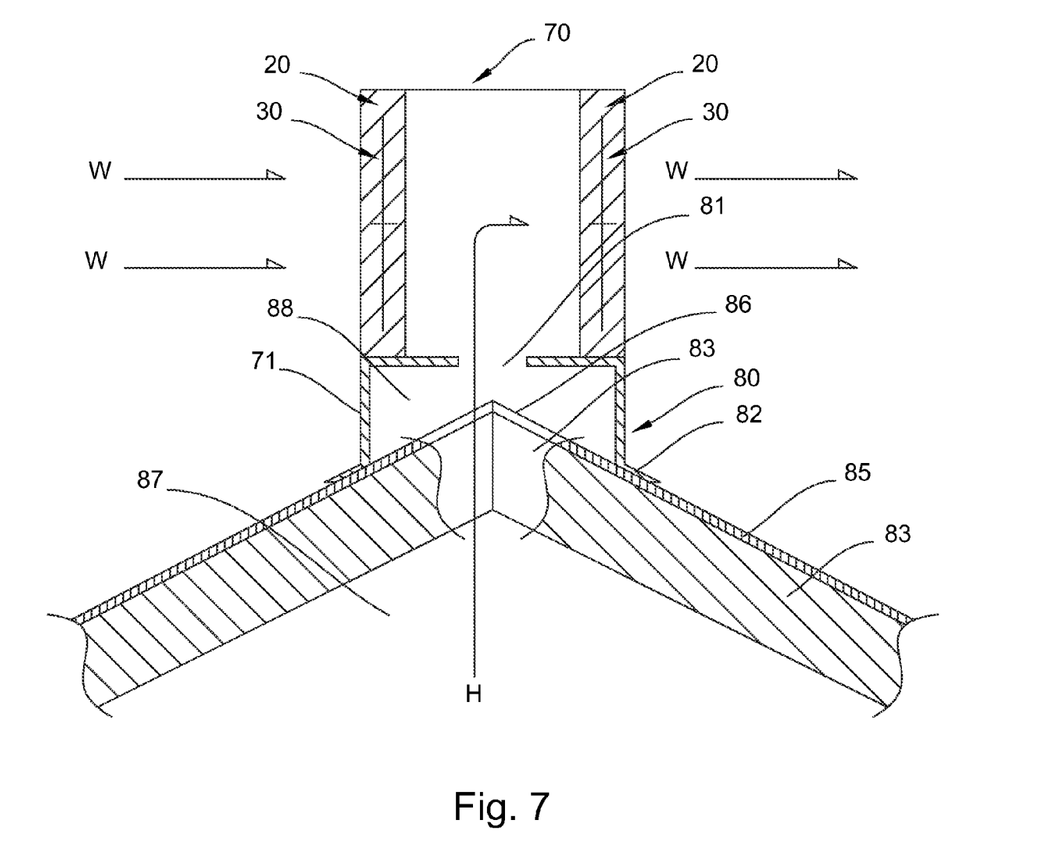
FIG. 7 is a cutaway side view of the polygonal housing and roof vent assembly of FIG. 5.

Multiple housings 70 are located in a row across the ridge of the roof 86 to capture wind as it flows up and across the roof, turning the enclosed turbine assembly 30. Roof vent assembly 80 in some embodiments also captures heated air from the attic space below as depicted in FIG. 7. In some embodiments many housings 70 are utilized, such that each one produces a portion of energy cumulatively, as in microgeneration.

Figure 6:
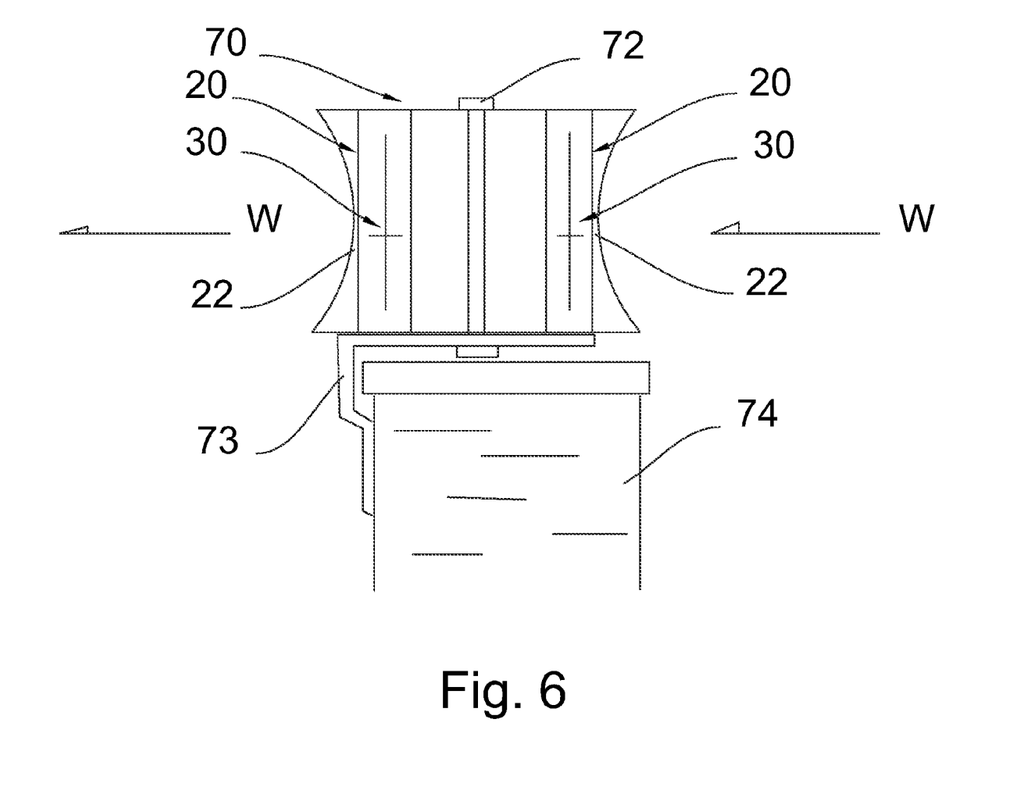
FIG. 6 is a side view of a third embodiment of a wind turbine alternator module depicting a polygonal housing, optional conical air collectors, optional pivot and including a structural attachment framework for the purposes of mounting on a parapet.

Housings 70 in some embodiments are set at installation time to a preferred azimuth to capture the prevalent winds in a non-pivoting installation. In some embodiments the housings 70 pivot up to 180 degrees, similar to pivot 72 as depicted in FIG. 6. In some embodiments, the polygonal housing 70 and roof vent assembly 80 are installed on a roof with no air exchange with the heated space below (not shown) and are installed at any location or angle on the roof 85, as required.

In some embodiments turbine assembly 30 diameter is in the one to two foot range, but in other embodiments is any size, depending on energy requirements. Housing 70 and vent assembly 80 materials are selected suitable for exterior roof placement and installation and in accordance with local building code requirements.

Currently accepted teachings suggest placement of conventional wind turbines on or near residential or commercial roofs results in poor performance due to obstructions, vortices and poor wind flow. However, placement of the housings 70 at the roof ridge 86 allow the turbine assembly 30 to capture wind at an accelerated speed as wind is compressed from flowing upwards over the building and upwards over the roof shingles 85.

Alternate embodiments allow for an unlimited variety of installation methods and attachment methods. Building structures vary greatly, requiring varying types and styles of attachment structures. Polygonal housings 70 are in some embodiments attached to chimneys, support poles, decorative apparatus, trees, fences or other structures as required for the particular location. Attachment structures, such as the vent assembly 80, serve to support one or more polygonal housings 70 and provide a means of anchoring polygonal housings 70.

FIG. 6 is a side view of a third embodiment of a wind turbine alternator module 20 depicting a polygonal housing 70, optional conical air collectors 22, optional rotational pivot 72 and a structural attachment framework 73 for the purposes of mounting on a parapet 74. The side panel of the polygon housing 70 has been removed in the drawing to allow a better view of the components. The polygonal housing 70 as depicted has two modules 20 at opposing sides. The polygonal housing 70 is attached to a bracket 73 to provide support from the building parapet 74 wall.

Multiple housings 70 are located in some embodiments where practical around the building roof to capture wind as it flows across the roof and into each turbine assembly 30. Polygonal housing 70 in some embodiments rotates or pivots around a center pivot 72. Optional pivoting is only required to be within 180 degrees since the wind turbine alternator module 20 produces energy bi-directionally, accepting air flow from either side of the housing.

Also shown is the optional conical air collector 22 on each side of the housing that helps increase the air flow and velocity through the turbine assembly 30.

Alternate embodiments allow for housings to be stacked, staggered or placed in any arrangement and attached using any method convenient for the installation. This embodiment shows an example of how the modules 70 can be utilized to generate energy in varying installations.

FIG. 7 is a cutaway side view of the polygonal housing 70 and roof vent assembly 80 of FIG. 5. The polygonal housing 70 has two turbine modules 20 at opposing sides. The polygonal housing 70 is attached to a roof vent assembly 80. The roof ridge 86 is cut away between roof rafters 83 (shown as cutaway between first and second set of rafters 83) to form an air exchange space 88 between the attic space 87 and the polygonal housing 70. The roof ridge vent assembly 80 encloses the ridge roof 86 cut away allowing heated air H to enter the air exchange space 88.

In some embodiments, the roof ridge vent assembly 80 encloses an existing commercially available ridge vent (not shown) allowing heated air H to enter the air exchange space 88 through the existing ridge vent. This feature allows for retrofitting existing roofs and minimizes installation costs.

A roof attachment structure 71 is attached to the roof 85 on each side of the ridge at roof nail flange 82 over the air exchange space 88. Wind flow W enters either side of the polygonal housing 70 and exits the opposite side, depending on wind direction. Alternate embodiments allow for polygon housing 70 to either rotate up to 180 degrees around a center pivot or to be preset at the prevalent wind asimuth for the installation. The FIG. 4 bi-directional vanes 31 of the turbine assembly 30 will rotate from direct and incident air flows and automatically reverse rotation when the prevalent wind reverses direction.

Air flow through the housing draws heated air H up from the attic space 87 which helps to reduce the temperature and remove humidity of the attic space 87 below. In some embodiments, in low or no wind conditions heated air H from the attic space 87 rises through the air vent hole 81 located between the polygonal housing 70 and the roof vent 80, exiting through one or more turbine assembly 30 and generating energy.

There is no requirement for the quantity of turbine modules 20 in a polygonal housing 70 and no requirement as to which sides of the polygon may be used. The quantity and location of the turbine modules 20 in the polygon housing 70 is determined by the site requirements.

Figure 8:
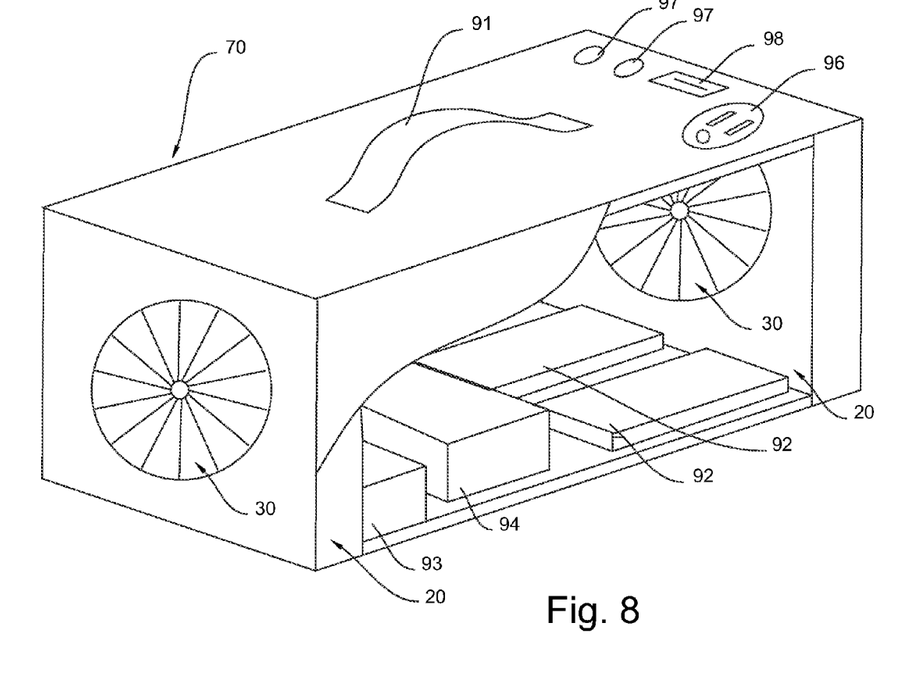
FIG. 8 is a perspective view of a fourth embodiment of the wind turbine alternator module depicting a portable polygonal housing.

FIG. 8 is a perspective view of a forth embodiment of the wind turbine alternator module 20 depicting a portable polygonal housing 70. Here, a portion of the side of the housing 70 has been removed to reveal the inner components. The portable polygonal housing 70 as depicted shows two modules 20 at opposing sides. On the top of the polygonal housing 70 is a handle 91 to allow easy manual transportation.

The design allows for any number of modules 20 in any configuration of polygon housing 70, including possible fold out, hinged or stacked arrangements.

Internally, the housing 70 has one or more storage batteries 92 to capture and store generated energy. A charging circuit 93 facilitates the charging of the batteries 92. Optionally connected to the batteries 92 and charging circuit 93 are various external power interfaces, such as direct current power posts 97 and USB power connector 98. Various other styles of connectors (not shown) may be utilized depending on the voltage and current characteristics of the design.

Also connected to the storage batteries 92 in some embodiments is an inverter circuit 94 to convert stored direct current into alternating current. Optionally connected to the inverter 94 output are external alternating current receptacles 96 of the rating consistent with the inverter 94 output characteristics.

Additional convenience devices (not shown) are in some embodiments incorporated into the portable housing design. In some embodiments, the portable housing is of a dedicated use for powering devices incorporated into the housing design and as such have no external power interfaces.

There are an unlimited variety of alternate embodiments that can be derived from the wind turbine alternator module. Utilizing one or more modules and mixing with batteries and/or charging circuits, inverter circuits and various power combinations, allows for many creative power solutions. Examples for the wind energy module include: emergency lighting, bicycle/motorcycle lighting, charging and power solutions for boats, vehicle auxiliary power generation, air glider power, recreational vehicle auxiliary power, military personnel mobile power, cell phone charging, emergency lighting, desolate site power systems and others.

The invention is not limited to the particular embodiments illustrated in the drawings and described above in detail. Those skilled in the art will recognize that other arrangements could be devised, for example, various shapes and sizes of modules of various materials, connected to various structures and objects and to one another in various fashions. The invention encompasses every possible combination of the various features of each embodiment disclosed. While the invention has been described with reference to specific illustrative embodiments, modifications and variations of the invention may be constructed without departing from the spirit and scope of the invention as set forth in the following claims.

I claim:

1. Apparatus for the production of energy from air movement, the apparatus comprising:
   a support structure;
   a turbine assembly comprising one or more vanes radiating from an unsupported hub to an outer rim;
   bearings located around and engaged with the turbine assembly supported by the support structure to maintain a constant spacing between rotor magnets and stator coils;
   a rotor comprising one or more magnets supported by the turbine assembly; and
   a stator comprising one or more coils configured such that relative motion between the magnets and coils induces a voltage across the stator coils.

2. The apparatus of claim 1, wherein the vanes are bi-directional.

3. The apparatus of claim 1, wherein the rotor comprises one or more backing rings attached to the outer rim of the turbine assembly and the rotor magnets are mounted on the backing rings.

4. The apparatus of claim 1, wherein the stator coils are wound without a ferromagnetic core.

5. The apparatus of claim 3, wherein one or more of the rotor backing rings contain ferromagnetic material.

6. The apparatus of claim 1, further comprising a rectifier circuit to convert generated alternating current into direct current.

7. The apparatus of claim 1, further comprising a temperature sensing circuit and heat elements for producing heat.

8. The apparatus of claim 1, further comprising an operational sensing circuit for communicating rotational activity.

9. The apparatus of claim 1, further comprising a voltage regulator circuit that diverts excess energy into a resistive load or external load or regulates the stator coils, to limit over-voltage conditions or to slow turbine assembly rotation.

10. The apparatus of claim 1, further comprising a support structure center pivot for rotational support about the axis of rotation.

11. The apparatus of claim 1, further comprising one or more conical air collectors for directing wind into the turbine assembly.

12. A housing comprising two openings and the apparatus of claim 1 in one or more of the openings.

13. The housing of claim 12, further comprising a structural attachment assembly for mounting.

14. The housing of claim 13, further comprising one or more additional opening configured for air exchange with an external structure.

15. The housing of claim 12, further comprising a housing center pivot for rotational support about the axis of rotation.

16. The apparatus of claim 1, wherein the support structure comprises a housing comprising first openings and one or more second openings and wherein one or more second opening is secured over a structural attachment assembly, wherein rotation of the turbine assembly generates electric power.

17. The apparatus of claim 16, wherein one or more second openings is configured for air exchange with attached structure.

18. The apparatus of claim 17, wherein the apparatus is positioned on the roof of a building such that air from the building structure enters, one or more second opening and exits one or more first opening through the turbine assembly.

19. The apparatus of claim 1, wherein the support structure comprises a housing comprising openings, wherein the turbine, rotor and stator are mounted in one or more of the openings, further comprising one or more energy storage devices, an energy storage device charging circuit, and a power interface, wherein rotation of the turbine assembly generates electric power.

20. The apparatus of claim 1, wherein the bearings have axes parallel to the axis of the turbine assembly.

* * * * *